United States Patent
Chen et al.

(10) Patent No.: US 7,493,272 B2
(45) Date of Patent: Feb. 17, 2009

(54) COMPUTER-IMPLEMENTED METHOD OF PERFORMANCE TESTING SOFTWARE APPLICATIONS

(75) Inventors: Jesse F. Chen, San Jose, CA (US); Chunguang Zheng, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 573 days.

(21) Appl. No.: 10/995,404

(22) Filed: Nov. 23, 2004

(65) Prior Publication Data
US 2006/0122913 A1   Jun. 8, 2006

(51) Int. Cl.
*G06Q 30/00* (2006.01)
(52) U.S. Cl. .............................. 705/26; 705/1; 705/27; 714/37; 714/38
(58) Field of Classification Search ............ 705/26–27, 705/1; 714/37, 38
See application file for complete search history.

(56) References Cited

U.S. PATENT DOCUMENTS 6,925,633 B1 * 8/2005 Barnett et al. ............... 717/124
2002/0035525 A1 * 3/2002 Yokota et al ................. 705/29
2002/0052806 A1 * 5/2002 Hodson et al. .............. 705/27
2003/0139918 A1   7/2003 Hardwick et al.
2004/0006453 A1   1/2004 Gluhovsky et al.
2004/0107125 A1 * 6/2004 Guheen et al. ............... 705/7

OTHER PUBLICATIONS

"E-Commerce—Picks, Clicks and Shopping Carts—Our first e-commerce lab test looks at three products ready to help you make the brick-to-click conversion." Keith Schulz. InternetWeek. Manhasset: Apr. 16, 2001, Iss. 857; p. 23. Retrieved via ProQuest on Sep. 26, 2008.*

* cited by examiner

*Primary Examiner*—Jeffrey A. Smith
*Assistant Examiner*—Michael A. Misiaszek
(74) *Attorney, Agent, or Firm*—Cuenot & Forsythe, L.L.C.

(57) ABSTRACT

A method of performance testing for software applications can include storing, in a network accessible location, options corresponding to functions for use in performance test cases and sending to a computer system an electronic document specifying at least one of the plurality of options. The computer system can be remotely located from the network accessible location. The method further can include receiving, from the computer system, input selecting at least one option from the electronic document and automatically generating a performance test case using functions corresponding to the selected option(s). The options can be selected through a Web-based shopping cart and/or system interface thereby easing the process of test case generation.

7 Claims, 6 Drawing Sheets

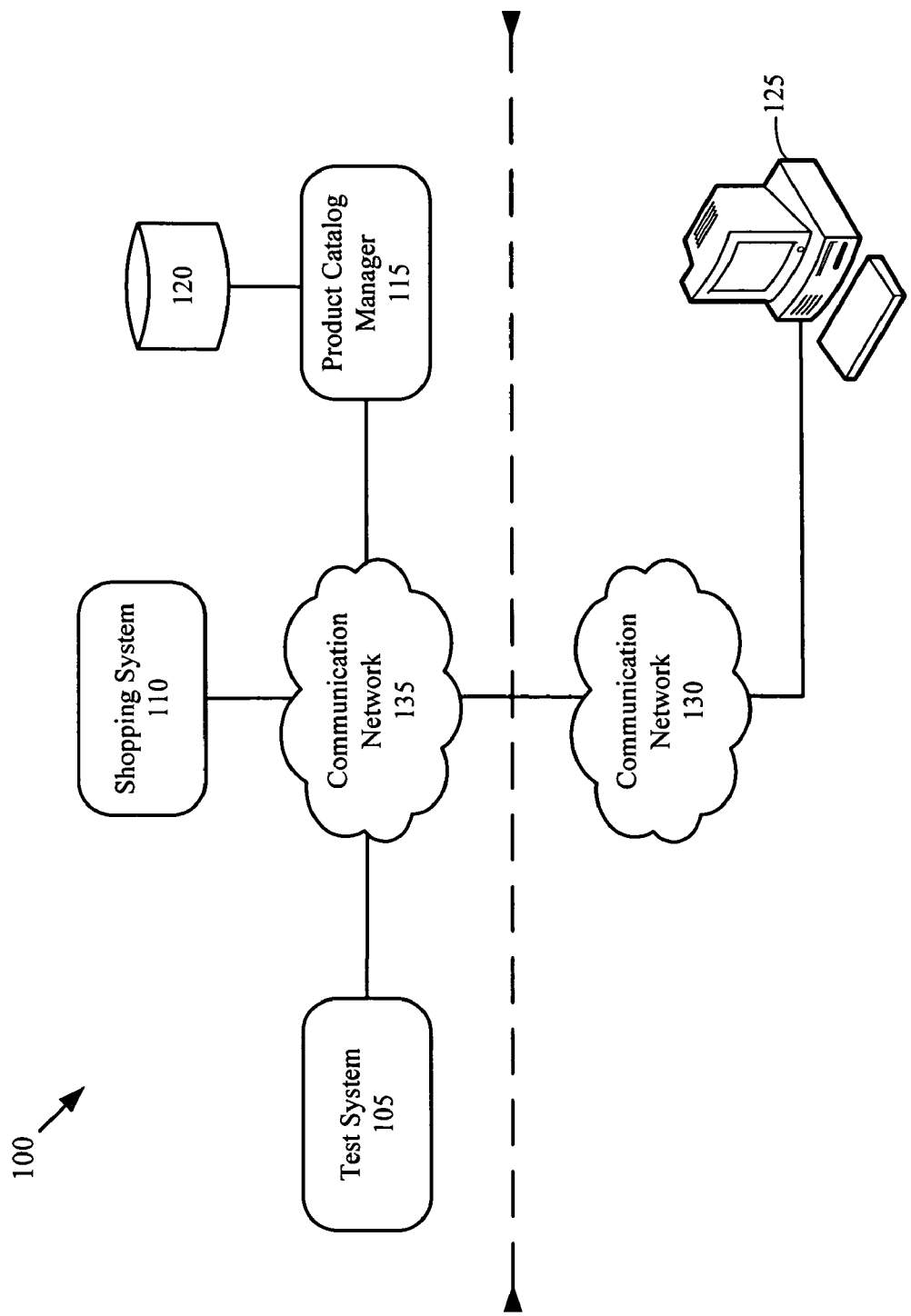

```
#===== 1. Log into application ===========
{% Connect
description = connect_____
numOfLoops = 1
%}

#===== 2. Create a new folder ==========
{% Import
numOfLoops = 5
description = folderadd_____
itemType = docfolder
isFolder = Yes
%}

#===== 3. Create a new document ==========
{% Import
numOfLoops = 5
description = docaddnopart_____
itemType = no_index
%}

#===== 4. Store a new document of size 1KB to doc created in step 3 ==========
{% RRUD
description = docupdate1kbtiff_____
order = addParts
input = Import
parameter = c:\cmtools\PerfProgs\TestCases\scenario-for-regression1\w\toc\1KB_TIFF.toc
%}

#===== 5. Log out of application ===========
{% Disconnect
description = disconnect_____
numOfLoops = 1
%}
```

FIG. 2

```
#===== 3. Create a new document ===========
{% Import .................................................................... Product, called "Import"
numOfLoops = 5 ............................................................ Quantity
description = docaddnopart_____    ........................ Product description
itemType = no_index .................................................... fixed text, always generate
%}

#===== 4. Store a new document of size 1KB to doc created in step 3 ===========
{% RRUD ..................................................................... Product, called RRUD
description = docupdate1kbtiff_____    ........................ Product description
order = addParts ........................................................... fixed text, always generate
input = Import .............................................................. fixed text, always generate
parameter = c:\cmtools\PerfProgs\TestCases\scenario-for-regression1\w\toc\1KB_TIFF.toc .. Size
%}
```

FIG. 3

COMPUTER-IMPLEMENTED METHOD OF PERFORMANCE TESTING SOFTWARE APPLICATIONS

BACKGROUND

1. Field of the Invention

The present invention relates to software development and, more particularly, to performance testing of software application.

2. Description of the Related Art

"On-demand" computing models have become increasingly popular in fields as diverse as finance, media, government, and the like. On-demand computing, referred to as OD computing, is an enterprise model in which computing resources are made available to a user as needed. While the resources can be maintained within the user's own enterprise, the resources also can be provided by service providers outside of the user's enterprise. The OD model allows organizations to deal with fluctuating computing demands in an efficient manner. This is advantageous in that computing resources within an enterprise can vary significantly over time.

The growth of OD computing also has spurred growth in the demand for high performance content management systems. A content management system (CMS) is a software-based system used to manage various forms of electronic content. CMS's are used within business organizations to manage electronic records, whether locally stored or distributed over a Local Area Network (LAN), a Wide Area Network (WAN), or the Internet.

The rise in OD computing, while beneficial from a financial standpoint, introduces a degree of complexity with respect to performance testing. Typically, a firm is engaged to design, size, implement, performance-test, and deploy a CMS. Tasks such as performance testing are performed on a per engagement basis for a specific CMS developed for a particular customer.

Performance testing a CMS is different than performance testing other varieties of computer-based systems. To better illustrate, contrast performance tests relating to a Web server with that of a customized CMS solution. When testing a Web server, the type of request being received is not particularly relevant. That is, whether the request is for audio, video, or text, the Web server performs the same retrieval function. The most significant aspect of the operation is not the nature of the request or the type of document requested, but rather the size of the requested document, i.e. a 10K text document versus a 100K image file.

To test a CMS properly, workloads that accurately reflect customer needs must be designed. For example, an auto insurance company may store thousands of application documents per day, but only search and retrieve documents from a limited collection of claim documents. A governmental organization may perform millions of searches per day, perform millions of document retrieval operations, but perform such operations against a limited data store that includes only several hundred thousand documents. As can be seen, the test scenarios needed to properly test each different type of CMS solution differ significantly from one another.

Performance testing a CMS is different than performance testing other varieties of computer-based systems. To better illustrate, contrast performance test relating to a Web server with that of a customized CMS solution. When testing a Web server, the type of request being received is not particularly relevant. That is, whether the request is for audio, video, or text, the Web server performs the same retrieval function. The most significant aspect of the operation is not the nature of the request or the type of document requested, but rather the size of the requested document, e.g., a 10 K text document versus a 100 K image file.

The development cycle for test cases can be lengthy and cumbersome. One reason is that, to date, there has not been a standard benchmark that defines how different CMS's are to perform throughout a workday, particularly in response to varying system demands. This can lengthen performance test case design time.

Another reason is that in order to reduce the workload description to a test case that can be understood and used by a software tester, a large amount of program code is required in the test execution engine. This code often is inflexible and requires high maintenance. A workload refers to the amount of processing that a computer system has been given to do at a given time. The workload typically specifies CMS functions to be executed as well as some number of users being connected to and interacting with the CMS. A defined workload can be specified as a benchmark when evaluating a computer system in terms of performance.

While test cases are created during development of a CMS, test cases also are used to diagnose problems experienced by customers. Users may experience problems after the CMS has been installed at the customer site. When the customer calls the CMS vendor for support, the vendor must recreate the conditions at the customer premises in an effort to diagnose the problem. This entails creating a workload and reducing the workload to a test case. As noted, this process can be both time consuming and cumbersome.

It would be beneficial to provide users with the ability to create test cases without having to manually code and/or edit each test case.

SUMMARY OF THE INVENTION

The present invention provides a solution for performance testing of software applications and, more particularly, content management system. One embodiment of the present invention can include a computer-implemented method of performance testing. The method can include storing, in a first computer system, a plurality of options corresponding to functions for use in performance test cases for each of a plurality of content management systems. Responsive to a user input from a second computer system selecting one of the plurality of the content management system that corresponds to a content management system of the user, only options of the plurality of options corresponding to the selected content management system can be presented within an electronic document, The electronic document can be a Web-page presented within a Web-based shopping system. Responsive to receiving at least one user input specifying selected ones of the plurality of options presented within the electronic document, each selected option can be added to an electronic shopping cart associated with the user. Responsive to a user input requesting check-out, a performance test case for the selected content management system can be automatically generated using functions corresponding to each of the selected option(s) within the electronic shopping cart of the user. The performance test case can be a test case control file.

BRIEF DESCRIPTION OF THE DRAWINGS

There are shown in the drawings, embodiments that are presently preferred; it being understood, however, that the invention is not limited to the precise arrangements and instrumentalities shown.

FIG. 1 is a schematic diagram illustrating a system for performance testing software applications in accordance with one embodiment of the present invention.

FIG. 2 is a listing of functions forming an example test case that can be executed by a test system.

FIG. 3 is a listing of functions corresponding to a test case in accordance with another embodiment of the present invention.

DETAILED DESCRIPTION OF THE INVENTION

Figure 4:
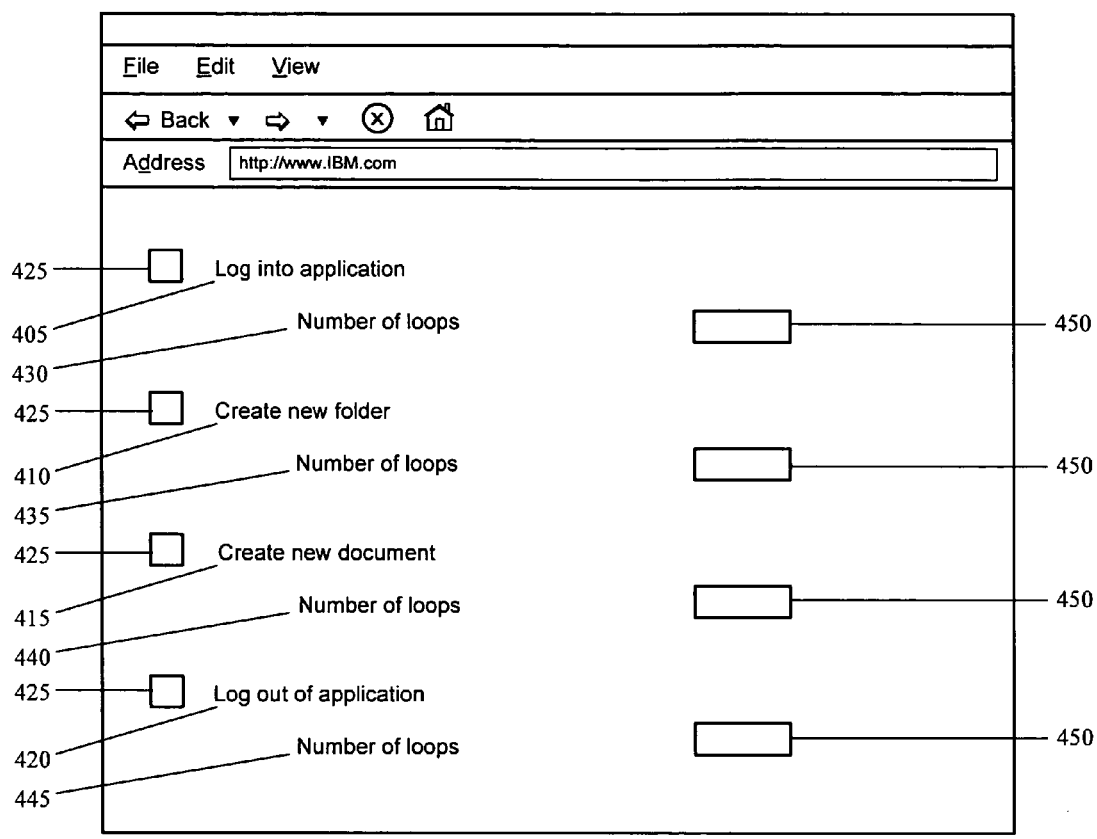
FIG. 4 is a pictorial view of a graphical user interface for creating a test case in accordance with another embodiment of the present invention.

The present invention provides a solution for performance testing a software application and, more particularly, a content management system (CMS). The present invention allows customers, or users, of a CMS from a particular vendor to access testing facilities in an online, and automated fashion. Users can select one or more functions and/or attributes to create a test case control file (test case) that can be executed by a test system. The functions and attributes can be presented to the user in a manner similar to the way in which goods or services are offered for sale through so called shopping cart style Web sites. Users can select functions and specify function attributes, which are then used to generate the test case.

FIG. 1 is a schematic diagram illustrating a system 100 for performance testing software applications in accordance with one embodiment of the present invention. As shown, the system 100 can include a performance test system (test system) 105, a shopping system 110, and a product catalog manager 115. The product catalog manager 115 can be connected with, or have incorporated therein, a data store 120. The test system 105, shopping system 110, and product catalog manager 115 each can be implemented as one or more computer programs executing within suitable information processing systems.

It should be appreciated that while these components are illustrated as separate entities, each can be located within a same computer system or one or more different computer systems interconnected by a communications network (network) 135. Network 135 can be implemented as a wide area network, a local area network, the Internet, the Web, the Public Switched Telephone Network, or the like.

Computer system 125 can be remotely located from system 100. In one embodiment, computer system 125 can be located on premises at a user site which has a CMS installed. In any case, computer system 125 can be communicatively linked with the system 100 via network 130 and/or network 135. Network 130 can be similar to that of network 135. While two networks are shown, in one embodiment networks 130 and 135 can be considered a single, integrated network. In another embodiment, network 130 can be a publicly accessible network, while network 135 can be a private network. Notwithstanding, the particular network configuration is not intended as a limitation of the present invention.

The data store 120 can include content corresponding to one or more different CMS's. The content can include selectable options, test functions associated with the options, attributes of the functions, and other content that can be presented in a Web page, whether text, graphics, video, audio, or the like. Content stored in data store 120 can be associated with one or more particular CMS's. For example, the data store 120 can include options, functions, and attributes associated with a plurality of different CMS's. As such, the content to be searched and/or filtered according to a specific CMS.

The product catalog manager 115 can access data store 120 to administer, edit, retrieve, store, and/or delete content stored therein. While the product catalog manager 115 can allow a user to perform the functions described herein, it also can provide an interface to another system requiring use of the content managed in data store 120, such as shopping system 110.

Shopping system 110 can be an online shopping system as is used with retail and other Web sites. Rather than providing goods and/or services in the conventional sense, the shopping system 110 can be used to present content drawn from the product catalog manager 115. Thus, the shopping system 110 can present selectable options corresponding to functions and function attributes for generating a test case.

In one embodiment, the shopping system 110 can be implemented as a shopping cart-style system. An online shopping cart is a metaphor taken from grocery store shopping carts. Typically, the user selects any products or services that are being ordered from one or more electronic documents such as Web pages and, when finished ordering, proceeds to a Web page where the total order, including billing and shipping information, is summarized for confirmation. The term shopping system, or shopping cart system, refers to the computer programs that provide a Web site with the ability to access a catalog of content, incorporate the content into a Web page, and integrate the Web pages into a Web site, thereby providing users with the functions described herein.

When shopping system 110 is implemented as a shopping cart system, rather than select goods or services, users can select various functions and attributes for inclusion in a test case relating to the particular type of CMS used by that user. The user can proceed through a check-out type process with the selected functions and attributes. The user essentially checks out with the functions and attributes that were selected or were "in the cart".

In one embodiment, the shopping system can be a custom system intended to manage and present functions for test cases and the attributes thereof. In another embodiment, however, a conventional shopping system can be used in which functions are analogized to products and customizable parameters and/or attributes of those functions are analogized with product details. For example, function attributes such as CPU usage, memory footprint, and number of database transactions can be analogized with product details such as price, size, weight, color, etc. typically found within a shopping system. Thus, within an existing shopping system, functions and function attributes as described herein can be used in lieu of product details.

The test system 105, as described herein, can be configured to execute various test cases to subject a software application, such as a CMS, to performance testing. In one embodiment of the present invention, the test system can be implemented as the Rational TestManager, available from International Business Machines Corporation of Armonk, N.Y. Still, it should be appreciated that other test systems can be used and that the present invention is not to be limited by the particular test system used.

In operation, a user of a particular CMS can experience a problem with the CMS. Through computer system 125, the user accesses a Web site associated with the particular CMS installed at the user's premises. The Web site can be designated for testing and evaluation of the CMS. In one embodiment, the shopping system 110 can generate and deliver a Web page to computer system 125 which specifies a listing of different CMS's. The user can select the particular CMS installed on the user premises. Responsive to a user input specifying a particular CMS, the shopping system 110 can access the product catalog manager 115 to retrieve any options associated with finctions and/or attributes for the selected CMS. The product catalog manager 115 can retrieve such content from the data store 120.

The shopping system 110 can generate one or more electronic documents such as Web pages specifying selectable options. The options, as noted, correspond to functions and attributes of the selected CMS. Through computer system 125, the user can navigate through one or more Web pages to select desired options, thereby specifying the functions to be included in a test case. This allows the user to create a test case that will recreate the problem experienced with the user's CMS. When finished with the selection process, the user can proceed to a check out.

In one embodiment, the selections made by the user can be processed by the shopping system 110 to generate a test case. For example, the shopping system 110 can include a test driver for translating the selected options into a test case. In another embodiment, the selected options can be provided to the test system 105. In that case, the test system 105 can be configured to generate the test case. Regardless, the test case can be provided to the test system 105 for execution.

The test system 105 can include, or be communicatively linked with the same version or type of CMS as is used by the user. Accordingly, one or more test cases can be executed by the test system 105 using a CMS that matches, and is configured the same as, the CMS installed at the user's premises. It should be appreciated that the test system 105 can be linked with, or include, a variety of different CMS's such that the particular one to be used in a given test can be specified by the test case itself or by the user, for example in consequence of identifying the user during a login procedure. In any case, results from execution of the test case can be presented back to the user through one or more other Web pages, which can be generated by the shopping system 110.

FIG. 2 is a listing of functions forming an example test case. As shown, the test case includes 5 functions or operations: (1) log into application; (2) create a new folder; (3) create a new document; (4) store a document of a specified size; and (5) log out of application. Each function includes an attribute called "numOfLoops" which dictates how many times the function will be repeated. Parameters or variables such as this can be modified by a test operator according to the desired workload to be generated by the test case.

In conventional test systems, test cases such as the one illustrated in FIG. 2 are coded manually. If any aspect of the test case is to be changed, such as the ordering of the functions or value of a variable, the changes are implemented by manually editing the text or code of the test case. While changes can be made to a small test case with relative ease, as the test case grows in size and complexity, it becomes burdensome and time consuming to create and edit test cases.

FIG. 3 is a listing of functions corresponding to a test case in accordance with another embodiment of the present invention. The listing illustrates one manner of equating functions with products that can be made available in an online shopping environment. In this illustration, customizable attributes of the functions traditionally altered manually have been associated with variables such as Quantity and Product. In this case, "product" identifies the particular function being performed. Text or other identifiers used as the selectable options in the shopping system Web pages can be obtained from variables such as the product name, can be extracted from remark statements, or other data structures associated with the stored function code. Attributes that are not customizable have been indicated with the annotation "fixed".

Thus, the code for the function "Create a new document" can be represented in a Web page by the selectable option "Create a new document". Selection of the identifier would cause the corresponding code to be included in a test case being constructed. The number of iterations for the function can be specified by a user and stored in a variable Quantity that is related to the function "Create a new document".

FIG. 4 is a pictorial view 400 of a graphical user interface for creating a test case in accordance with another embodiment of the present invention. View 400 is representative of one typically displayed by a browser, such as one executing in a computer system of a user having accessed a test Web site of a CMS provider or vendor. View 400 can be presented, for example, after a user has logged onto the Web site and been identified to the shopping system.

View 400 includes one or more selectable options 405, 410, 415, and 420, each corresponding to a function of the particular CMS used by the user. The shopping system can include a variety of different functions, each corresponding to different CMS solutions used by different users. By identifying the user through a login process, those functions associated with the particular CMS of the user can be located and presented in view 400.

The functions available can be identified by a text description of the function as shown, by a graphic icon, or other identifier. Included next, or proximate to, each option can be a user interface element that allows the user to select the option. View 400 includes a check box 425 selection mechanism for each option. Beneath each option can be a listing of any attributes relating to the function described by the selectable option. In the case illustrated by view 400, options 405, 410, 415, 420, and 425 have been associated with "number of loops" attributes 430, 435, 440, and 445 respectively. Each of the attributes 430-445 has been associated with a user interface element 450. In this case, the user interface element is a text field in which a user can specify a value.

The functions and attributes illustrated in FIG. 4 are not intended to be an exhaustive listing. Rather, any function or operation available in a test system can be represented as a selection, with attributes of the function being shown as changeable parameters. Thus, using one or more Web pages configured as shown in FIG. 4, users of a CMS can select those functions which are to be included in a test case. The functions can be selected in an effort to replicate a condition or fault detected in the user's CMS installation.

The configuration of view 400 has been shown for purposes of illustration only. Those skilled in the art will recognize that other embodiments also are contemplated by the inventive arrangements. In one embodiment, two columns can be presented. The first column can be a listing of possible functions and the second column can be a listing of selected functions to be included in the test case. The user can be presented with an "add" control to add a selected function to the second column, a "remove" control to remove a selected function from the second column, as well as "up" and "down" controls for varying the order of the functions in the second column.

It also should be appreciated that the particular user interface elements described herein are used for illustration only and that any of a variety of user interface elements can be used. For example, radio buttons, drop down menus, and the like can be used to select and/or specify attributes. In one embodiment, the actual text or identifier representing a function can be chosen by selecting the option with a pointer. Accordingly, the use of a particular user interface element is not intended as a limitation of the present invention.

Figure 5:
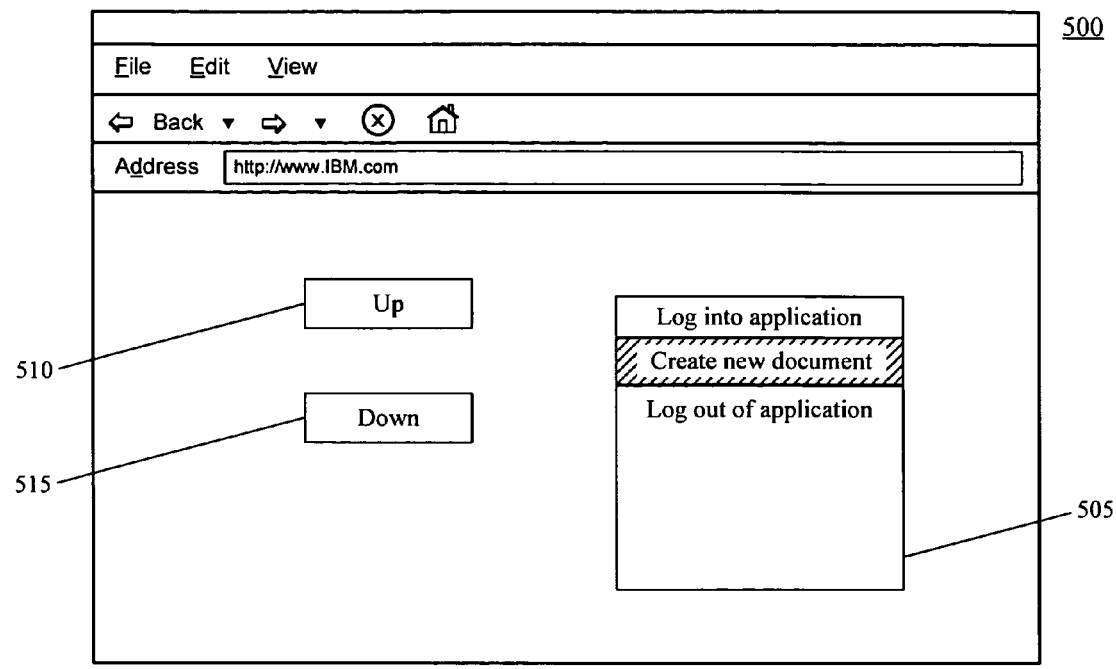
FIG. 5 is a pictorial view of a graphical user interface for creating a test case in accordance with another embodiment of the present invention.

FIG. 5 is a pictorial view 500 of a graphical user interface for creating a test case in accordance with another embodiment of the present invention. View 500 is an example of another Web page that can be generated by the shopping system for presentation within a browser executing in the user computer system. View 500 can be used for varying the order of functions that have been selected through the shopping system. Selected functions can be listed in window 505. Using a pointer or other key commands, a user can select a desired function, in this case "Create new document". Using controls 510 and/or 515, the user can move the selected function either up or down in the list shown in window 505, thereby changing the order of operation of the functions.

Figure 6:
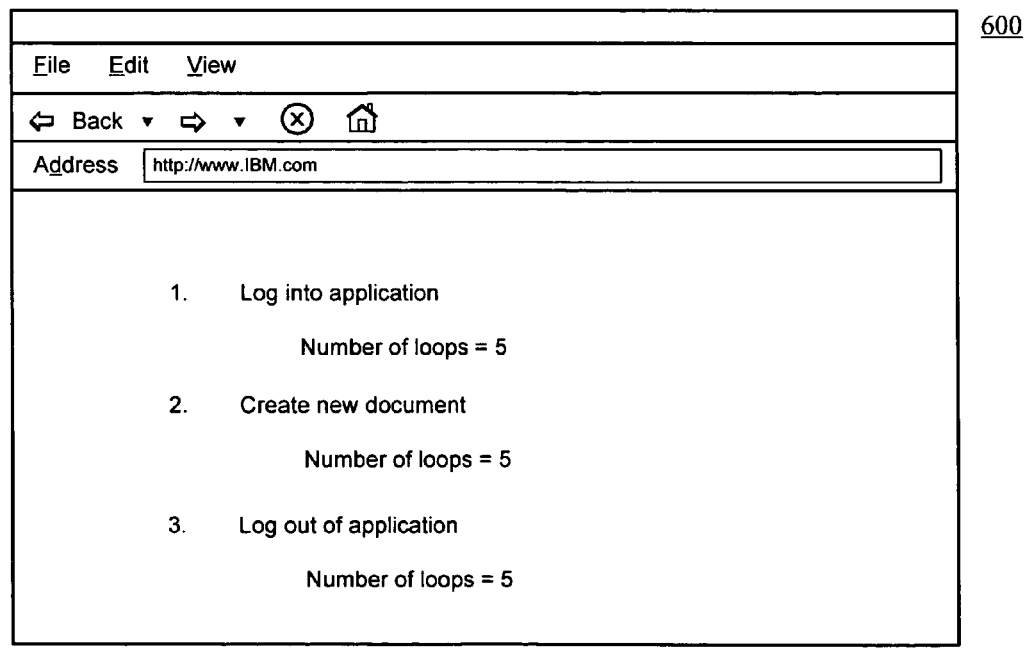
FIG. 6 is a pictorial view of a graphical user interface for creating a test case in accordance with yet another embodiment of the present invention.

FIG. 6 is a pictorial view 600 of a graphical user interface for creating a test case in accordance with another embodiment of the present invention. View 600 illustrates a summary view of selected functions and attributes that will be used in generating the test case. In one embodiment, view 600 can be presented from the shopping system in a browser responsive to selecting a check-out option. View 600 specifies the particular functions selected by the user, the attribute values selected for the functions, as well as the ordering of the functions. The information presented in view 600 can be presented in Web pages that otherwise would be used for verifying shipping address information, payment options, the goods or services that were selected for purchase, or the like.

FIGS. 4-6, taken collectively, illustrate one embodiment of a Web site allowing users to create test cases for a CMS. It should be appreciated, however, that other embodiments are within the scope of the present invention. For example, different user interface objects can be used in place of those described. Accordingly, the depiction of a particular type of user interface object and/or Web page is not intended to limit the scope of the present invention.

Further, it should be appreciated that other features of an online shopping environment can be incorporated into the present invention. For example, the user can be provided with a variety of navigational tools for browsing various functions. Another online shopping feature that can be incorporated into the present invention can be a "you will also like" function. The "you will also like" function identifies the user's selections and proposes additional selections that are related to the selected items.

The "you will also like" feature can be driven by proposing functions that have been classified as being related to one or more selected functions. In one embodiment, historical data can be used to determine which functions are related to selected functions. In that case, past user selections can be analyzed, whether for the same user or for a set of different users. When a user selects a particular function, the shopping system can present the user with one or more candidate functions. The candidates can be presented with description indicating that users that originally selected the functions chosen by the user also, or commonly, selected one of more of the candidate functions.

In another embodiment, functions can be related within the product catalog manager manually, for example by a system administrator. For instance, functions can be classified according to type. The "log into application" and "log out of application" functions can be classified as being of the same type. Functions related to file manipulation and/or management can be classified as another type. In such an arrangement, one or more functions of the same type as those selected by the user can be proposed as candidates by the shopping software for selection by the user.

With respect to test system 105, if a series of performance tests are received, a process queue can be created to make certain each test is executed in the order the test case arrived. The notion of a "shipping method" can be used to determine the priority of the test case within the queue. Here, expedited shipment can be analogized with the priority of the test case within the queue. For example, expedited shipping can correspond with advancing the associated test case toward the top of the queue.

Figure 7:
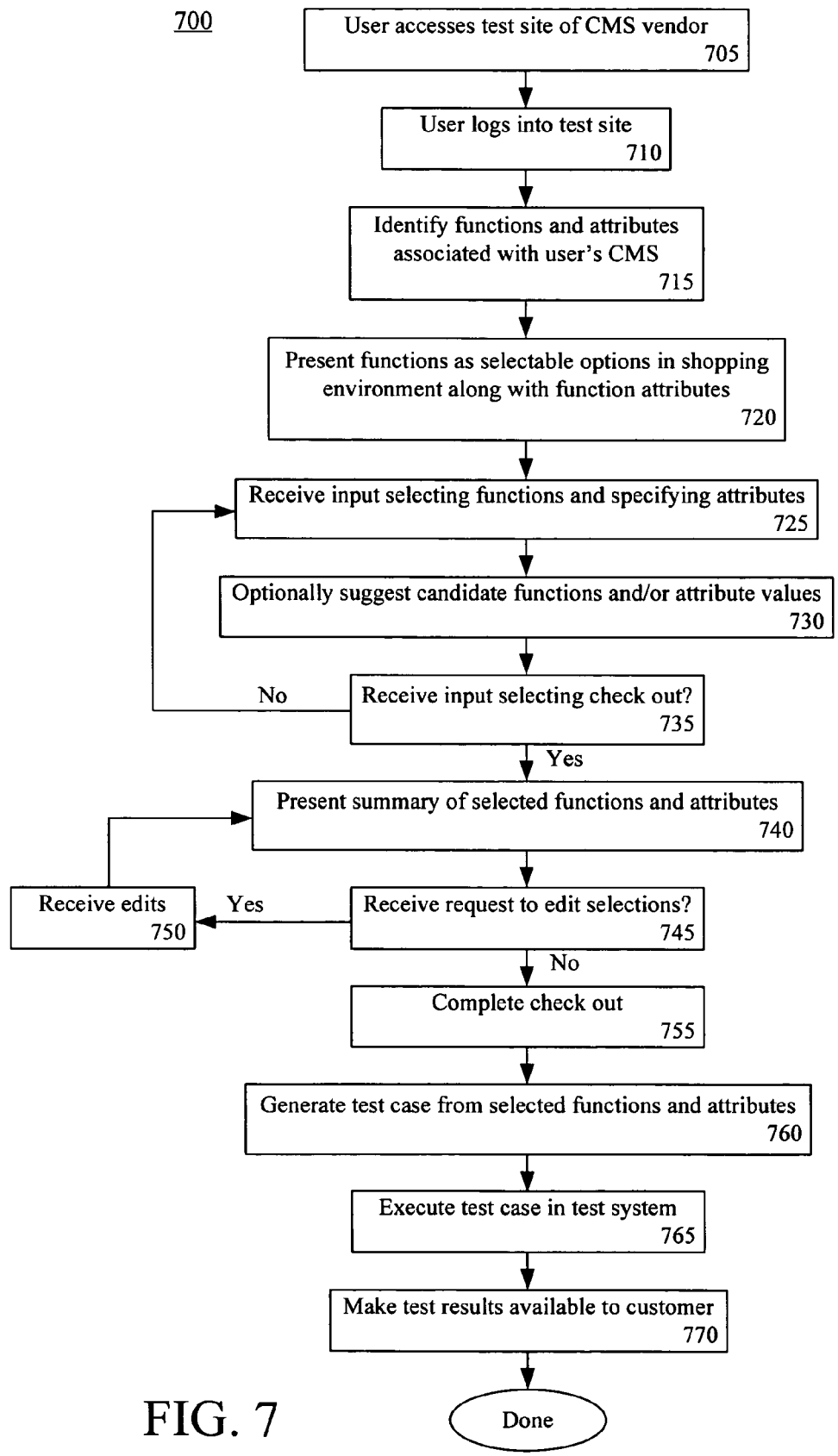
FIG. 7 is a flow chart illustrating a method of performance testing in accordance with another embodiment of the present invention.

FIG. 7 is a flow chart illustrating a method 700 of performance testing in accordance with another embodiment of the present invention. The method 700 can be implemented by the system of FIG. 1 to provide an automated method of generating a test case based upon user input. The method 700 can begin in a state where a user has experienced a problem with a CMS installed at the user premises. Accordingly, in step 705, the user can access a test Web site of the CMS vendor through a computer system. The computer system of the user can be remotely located from the testing system described herein.

In step 710, the user can log into the test Web site. This allows the shopping system to identify the user as well as the particular CMS version or solution that has been installed at the user premises. In step 715, based upon the identity of the user, the shopping system can determine or identify the functions and/or attributes that are associated with the user's CMS.

In step 720, those functions that have been identified as being associated with the user's CMS can be presented in a Web page. As noted, the functions, as well as the attributes of the functions, can be presented in an online shopping environment such as through a shopping cart type interface. In step 725, the shopping system can receive input from the user which selects particular functions to be included into a test case. The input further can specify the values of attributes for the selected functions.

In step 730, the shopping system optionally can present the user with one or more suggested functions and/or attribute values. These suggestions can be presented via a Web page during the shopping process. In step 735, a determination can be made as to whether input has been received from the user requesting to proceed to check out. If so, the method can proceed to step 740. If not, the method can loop back to step 725 until such time that a check out request is received. In that case, the user can continue shopping for further functions and/or edit existing selections. Notably, the user also can alter the order in which the functions are to be executed during the shopping or selection process.

Continuing with step 740, a summary of selected functions and attributes can be presented to the user. Such information can be presented in a summary view Web page. In step 745, a further determination can be made as to whether a user request to edit the summary information has been received. If so, the method can proceed to step 750 where further edits can be received. The edits can specify that one or more functions are to be added or removed from the list of functions to be used in generating a test case. The edits further can modify values of attributes as well as change the order in which the functions are to be executed.

If no request to edit the summary information is received, the method can continue to step 755. In step 755, the check out process can be finalized. The functions selected by the user can be identified as well as the attribute values corresponding to each selected function. In step 760, a test case can be generated based upon the functions selected by the user and the attribute values specified by the user during the shopping process.

In step 765, the test case can be executed by a test system. As noted, the test system can be remotely located from the user's computer system and/or premises. As noted, the test system can include or be connected with a same version of the CMS as used by the user or customer. If the test system is able to access a plurality of different CMS types or versions, the particular type or version of the CMS to be used by the test system can be selected based upon information specified within the test case. For example, such information can be maintained in the shopping system such that when the user logs on, the CMS type or version is retrieved or identified. Alternatively, the user can manually specify the type or version of CMS to be used for the test case. In step 770, any results from the test execution can be made available to the user, for example via the test Web site, an electronic mail, facsimile, instant message, or other messaging means.

While not illustrated in FIG. 7, it should be appreciated that shopping selections and/or test cases can be saved by the shopping system such that a user, once logged onto the test Web site, can recall past test cases or sets of functions and attributes. Thus, after executing a test case and viewing the results, the user can access a prior test case or function set and make any modifications necessary. The modified selections and/or attributes can be saved as another function set or test case and then executed. In this manner, the user can continue to modify test cases to model the conditions that existed at the user premises at the time a fault or other abnormal behavior with respect to the user's CMS was observed.

The inventive arrangements disclosed herein provide a solution for performance testing CMS's. The present invention facilitates the creation of test cases without the need for personnel to manually code the test case. Instead, functions and attributes can be selected as if shopping for goods or services from an online shopping system, thereby shielding testers from the complexity of coding test cases. The development and debug time commonly associated with developing a CMS solution is significantly reduced while also providing the CMS user with a system for testing installed CMS solutions.

The present invention can be realized in hardware, software, or a combination of hardware and software. The present invention can be realized in a centralized fashion in one computer system or in a distributed fashion where different elements are spread across several interconnected computer systems. Any kind of computer system or other apparatus adapted for carrying out the methods described herein is suited. A typical combination of hardware and software can be a general-purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program, software, or software application, in the present context, means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A computer-implemented method of performance testing software applications comprising:
    storing, in a first computer system, a plurality of options corresponding to functions for use in performance test cases for each of a plurality of content management systems;
    responsive to a user input from a second computer system selecting one of the plurality of content management systems that corresponds to a content management system of the user, presenting only options of the plurality of options corresponding to the selected content management system within an electronic document, wherein the electronic document is a Web-page presented as part of a Web-based shopping system;
    responsive to receiving at least one user input specifying selected ones of the plurality of options presented within the electronic document, adding each selected option to an electronic shopping cart associated with the user;
    responsive to a user input requesting check-out, automatically generating a performance test case for the selected content management system using functions corresponding to each selected option within the electronic shopping cart of the user, wherein the performance test case is a test case control file.

2. The method of claim 1, further comprising displaying the options specified by the electronic document in a user-selectable format.

3. The method of claim 2, the method further comprising receiving at least one user input selecting the at least one option from the electronic document.

4. The method of claim 1, said automatically generating step comprising using the Web-based shopping system to generate the performance test case.

5. The method of claim 1, further comprising:
    determining a configuration for the content management system of the user responsive to at least one of a login of the user or the performance test case;
    configuring a test content management system with the configuration for the content management system of the user, wherein the test content management system is a same type as the content management system of the user;
    executing the performance test case in the test content management system, wherein the test content management system is remotely located from the second computer system and the content management system of the user; and
    providing results of the executing the performance test case to the second computer system.

6. The method of claim 5, further comprising:
    receiving a plurality of automatically generated test cases in a queue, wherein each test case is associated with a user-selected shipping method;
    prioritizing each test case in the queue according to the shipping method; and
    executing test cases from the queue according to priority.

7. The method of claim 1, further comprising:
identifying at least one additional option from the stored options, wherein the at least one additional option is related to the at least one selected option; and
sending the at least one additional option to the computer system for presentation.

* * * * *